(12) United States Patent
Conn et al.

(10) Patent No.: US 9,133,708 B2
(45) Date of Patent: Sep. 15, 2015

(54) ESTIMATION AND COMPENSATION OF PRESSURE AND FLOW INDUCED DISTORTION IN MUD-PULSE TELEMETRY

(75) Inventors: David Conn, Sugar Land, TX (US); Julius Kusuma, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 346 days.

(21) Appl. No.: 13/591,670

(22) Filed: Aug. 22, 2012

(65) Prior Publication Data

US 2013/0082845 A1 Apr. 4, 2013

Related U.S. Application Data

(60) Provisional application No. 61/529,415, filed on Aug. 31, 2011.

(51) Int. Cl.
  *E21B 47/18* (2012.01)
  *G01F 1/34* (2006.01)

(52) U.S. Cl.
  CPC .. *E21B 47/18* (2013.01); *G01F 1/34* (2013.01)

(58) Field of Classification Search
  USPC .............................. 340/855.4, 854.3; 367/83
  See application file for complete search history.

(56) References Cited

U.S. PATENT DOCUMENTS

| | | | |
|---|---|---|---|
| 6,434,487 B1 * | 8/2002 | Thompson ...................... 702/14 |
| 6,512,720 B1 * | 1/2003 | Yang .............................. 367/134 |
| 7,079,449 B2 * | 7/2006 | Shook et al. ..................... 367/47 |
| 7,200,196 B2 * | 4/2007 | Li et al. ........................... 375/355 |
| 7,525,873 B1 * | 4/2009 | Bush et al. ...................... 367/47 |
| 7,577,528 B2 * | 8/2009 | Li et al. .............................. 702/6 |
| 8,860,582 B2 * | 10/2014 | Clark ......................... 340/853.2 |
| 2002/0101373 A1 * | 8/2002 | Arndt et al. .................... 342/124 |
| 2004/0213337 A1 * | 10/2004 | Li et al. .......................... 375/222 |
| 2007/0132606 A1 * | 6/2007 | Reckmann et al. ......... 340/855.4 |
| 2007/0189119 A1 * | 8/2007 | Klotz et al. ..................... 367/83 |
| 2007/0201308 A1 * | 8/2007 | Wassermann et al. .......... 367/82 |

(Continued)

FOREIGN PATENT DOCUMENTS

GB 2147722 5/1985

OTHER PUBLICATIONS

Combined Search and Examination Report for the equivalent GB patent application No. GB1215437.3 issued on Oct. 12, 2012.

(Continued)

*Primary Examiner* — Benjamin C Lee
*Assistant Examiner* — Chico A Foxx
(74) *Attorney, Agent, or Firm* — Chadwick A. Sullivan; Wesley Noah

(57) ABSTRACT

A method for reconstituting a signal due to a flow distortion in a mud-pulse telemetry system, having steps of obtaining at least one parameter to be transmitted by a transmitter to a receiver through the mud-pulse telemetry system, estimating a change in a flow rate in a borehole fluid along a trajectory of the mud-pulse telemetry system undergoing a fluid distortion, estimating a Doppler rate of the signal traveling through the borehole fluid along the trajectory of the mud-pulse telemetry system, calculating a Doppler compensation value for the signal sent along the trajectory in the borehole fluid, transmitting the signal of the at least one parameter through the mud-pulse telemetry system, receiving a portion of the signal of the at least one parameter and reconstituting at least a portion of the signal using the Doppler compensation value.

8 Claims, 4 Drawing Sheets

(56) References Cited

U.S. PATENT DOCUMENTS

| | | | |
|---|---|---|---|
| 2008/0002524 A1 | 1/2008 | Wassermann et al. | |
| 2008/0037369 A1 | 2/2008 | Hentati | |
| 2009/0242274 A1* | 10/2009 | Chen et al. | 175/50 |
| 2010/0194584 A1* | 8/2010 | Savage | 340/853.1 |
| 2011/0109912 A1* | 5/2011 | Spross et al. | 356/477 |
| 2011/0199862 A1* | 8/2011 | Pop | 367/81 |
| 2011/0246098 A1* | 10/2011 | Takemura et al. | 702/48 |
| 2011/0251796 A1* | 10/2011 | Waid et al. | 702/11 |
| 2014/0330522 A1* | 11/2014 | Manin | 702/12 |

OTHER PUBLICATIONS

Lasseter, T., Karakas, M., and Schweitzer, "Interpreting an RFT-Measured Pulse Test with a Three-Dimensional Simulator," J., SPE 14878, Mar. 1988.

Bunn, G.F., and Yaxley, L.M., "Design, Implementation, and Interpretation of a Three-Dimensional Well Test in the Cormorant Field, North Sea," SPE 15858, Oct. 1986.

Saeedi, J., and Standen, E., "Layer Pulse Testing Using a Wireline Formation Tester," SPE 16803, Sep. 1987.

Bunn, G.F., Wittman, M.J., Morgan, W.D., and Curnutt, R.C., "Distributed Pressure Measurements Allow Early Quantification of Reservoir Dynamics in the Jene Field," SPE 17682, Mar. 1991.

Yaxley, L.M., and Blaymires, J. M., "A Field Example of Interference Testing Across a Partially Communicating Fault," SPE 19306, 1989.

Kaneda, R., Saeedi, J., and Ayestaran, L.C., "Interpretation of a Pulse Test in a Layered Reservoir," SPE 19306, Dec. 1991.

* cited by examiner

ESTIMATION AND COMPENSATION OF PRESSURE AND FLOW INDUCED DISTORTION IN MUD-PULSE TELEMETRY

CROSS-REFERENCE TO RELATED APPLICATIONS

The present application seeks priority to U.S. Provisional Application 61/529,415 filed Aug. 31, 2011, the entirety of which is incorporated by reference.

FIELD OF THE INVENTION

Aspects relate to mud-pulse telemetry. More specifically, aspects relate to estimation and compensation of data in mud-pulse telemetry for compensation of distortion cause by, for example, flow distortion.

BACKGROUND INFORMATION

Mud-pulse telemetry is used to send signals from a downhole environment to an uphole environment. During mud-pulse telemetry operations, distortion can develop as a result of various reasons. Such reasons may be related to formation geometry and constituents, borehole geometry and mud pump operation as non-limiting possibilities.

Distortion of data may lead to various problems. Distorted data may lead operators to incorrect assumptions about formation parameters and/or borehole parameters. It is therefore imperative that the data provided from the downhole environment to the uphole environment is free from distortion to the greatest extent possible. It is further imperative that the data provided from the downhole environment to the uphole environment is of the highest quality to provide operators with the most accurate data obtainable.

Distortion of data also leads to total elimination of a communication link with a downhole tool. Distortion, when of a significant amount, can eliminate communication between the transmitter and receiver.

Phase distortion of fluids during pressure changes, such as during a downlink, can cause additional problems. For communication from an uphole environment to the downhole environment, defined as a downlink, such communications may introduce data distortion. To send signals from the uphole environment to the downhole environment, for example, mud pumps may be cycled to create the desired pressure pulses. The creating of these pulses may cause phase changes in the fluid, consequently creating distortion.

There is a need to provide for methods of communication that minimizes distortion.

SUMMARY

In one aspect, a method for reconstituting a signal due to a flow distortion in a mud-pulse telemetry system, comprising steps of obtaining at least one parameter to be transmitted by a transmitter to a receiver through the mud-pulse telemetry system, estimating a change in a flow rate in a borehole fluid along a trajectory of the mud-pulse telemetry system undergoing a fluid distortion, estimating an amplitude and velocity of pressure propagation of the signal traveling through the borehole fluid along the trajectory of the mud-pulse telemetry system, calculating a compensation value for the signal sent along the trajectory in the borehole fluid, transmitting the signal of the at least one parameter through the mud-pulse telemetry system, receiving at least a portion of the signal of the at least one parameter and reconstituting at least a portion of the signal using the compensation value.

DETAILED DESCRIPTION

Figure 1:
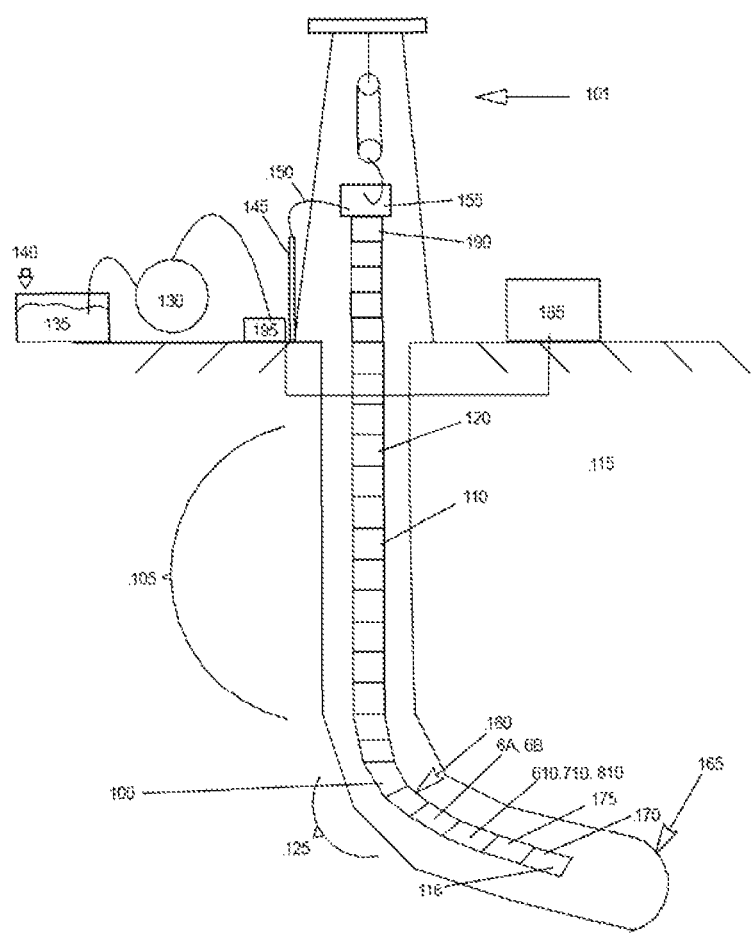
FIG. 1 is a cross-sectional illustration of a drilling rig that uses mud-pulse telemetry.

It will be understood that the following disclosure provides many different embodiments, or examples, for implementing different features of various embodiments. Specific examples of components and arrangements are described below to simplify the present disclosure. These are, of course, merely examples and are not intended to be limiting. In addition, this disclosure may repeat reference numerals and/or letters in the various examples. This repetition is for the purpose of simplicity and clarity and does not itself dictate a relationship between the various embodiments and/or configurations discussed. Moreover, the subterranean formation of a first feature over or on a second feature in the description that may include embodiments in which the first and second features are formed in direct contact, and may also include embodiments in which additional features may be formed interposing the first and second features, such that the first and second features may not be in direct contact.

In accordance with the present disclosure, a wellsite with associated wellbore and apparatus is described in order to describe a typical, but not limiting, embodiment of the application. To that end, apparatus at the wellsite may be altered, as necessary, due to field considerations encountered.

An example well site system is schematically depicted in FIG. 1 wherein components described above are incorporated in the larger systems described therein. The well site comprises a well. A drill string 105 may extend from the drill rig 101 into a zone of the formation of reservoir 115. The drill string 105 uses the mud pulse telemetry system 100, described later, for transmitting data from downhole to the surface.

The drill string 105 may also use a combination of telemetry systems, such as electromagnetic, mud pulse, acoustic anchor wired drill pipe, however in an embodiment, only the mud pulse telemetry system 100 is used. A bottom hole assembly is suspended at the end of the drill string 105. In an embodiment, the bottom hole assembly comprises a plurality of measurement-while-drilling or logging-while-drilling downhole tools 125, as illustrated in FIG. 1 such as shown by numerals 6a and 6b. For example, one or more of the downhole tools 6a and 6b. may be a formation pressure while drilling tool.

Logging-while-drilling tools used at the end of the drill string 105 may include a thick walled housing, commonly referred to as a drill collar, and may include one or more of a number of logging devices. The logging-while-drilling tool may be capable of measuring, processing, and/or storing information therein, as well as communicating with equipment disposed at the surface of the well site.

Measurement-while-drilling tools may include one or more of the following measuring tools: a modulator, a weight on bit measuring device, a torque measuring device, a vibration measuring device, a shock measuring device, a stick slip measuring device, a direction measuring device, and inclination measuring device, and\or any other device.

Measurements made by the bottom hole assembly or other tools and sensors with the drill string 105 may be transmitted to a surface computing system 185 for analysis. For example, mud pulses may be used to broadcast formation measurements performed by one or more of the downhole tools 6a and 6b to the surface computing system 185.

The surface computing system 185 is configured to host a plurality of models, such as a reservoir model, and to acquire and process data from downhole components, as well as determine the bottom hole location in the reservoir 115 from measurement while drilling data. Examples of reservoir models and cross well interference testing may be found in the following references: "Interpreting an RFT-Measured Pulse Test with a Three-Dimensional Simulator" by Lasseter, T., Karakas, M., and Schweitzer, J., SPE 14878, March 1988, "Design, Implementation, and Interpretation of a Three-Dimensional Well Test in the Cormorant Field, North Sea" by Bunn, G. F., and Yaxley, L. M., SPE 15858, October 1986. "Layer Pulse Testing Using a Wireline Formation Tester" by Saeedi, J., and Standen, E., SPE 16803, September 1987. "Distributed Pressure Measurements Allow Early Quantification of Reservoir Dynamics in the Jene Field" by Bunn, G. F., Wittman, M. J., Morgan, W. D., and Curnutt, R. C. SPE 17682, March 1991. "A Field Example of Interference Testing Across a Partially Communicating Fault" by Yaxley, L. M., and Blaymires, J. M., SPE 19306, 1989. "Interpretation of a Pulse Test in a Layered Reservoir" by Kaneda, R. Saeedi, J., and Ayestaran, L. C., SPE 19306, December 1991.

The drill rig 101 or similar functioning device may be used to move the drill string 105 within the well that is being drilled through subterranean formations of the reservoir, generally at 115 in FIG. 1. The drill string 105 may be extended into the subterranean formations with a number of coupled drill pipes (one of which is designated 120) of the drill string 105. The drill pipe comprising the drill string 105 may be structurally similar to ordinary drill pipes, as illustrated in U.S. Pat. No. 6,174,001, issued to Enderle, entitled "Two-Step, a Low Torque, Wedge Thread for Tubular Connector," issued Aug. 7, 2001, which is incorporated herein by reference in its entirety, and include a cable associated with each drill pipe 120 that serves as a communication channel.

The bottom hole assembly at the lower end of the drill string 105 may include one, an assembly, or a string of downhole tools. In the illustrated example, the downhole tool string 105 may include well logging tools 125 coupled to a lower end thereof. As used in the present description, the term well logging tool or a string of such tools, may include at least one or more logging while drilling tools ("LWD"), formation evaluation tools, formation sampling tools and other tools capable of measuring a characteristic of the subterranean formations of the reservoir 115 and\or of the well.

Several of the components disposed proximate to the drill rig 101 may be used to operate components of the system. These components will be explained with respect to their uses in drilling the well 110 for a better understanding thereof. The drill string 105 may be used to turn and actually urge a drill bit 116 into the bottom of the well 110 to increase its length (depth). During drilling of the well 110, a pump 130 lifts drilling fluid (mud) 135 from a tank 140 or pits and discharges the mud 135 under pressure through a standpipe 145 and flexible conduit 150 or hose, through a top drive 155 and into an interior passage inside the drill string 105. The mud 135 which can be water or oil-based, exits the drill string 105 through courses or nozzles (not shown separately) in the drill bit 116, wherein it cools and lubricates the drill bit 116 and lifts drill cuttings generated by the drill bit 116 to the surface of the earth through an annular arrangement.

When the well 110 has been drilled to a selected depth, the well logging tools 125 may be positioned at the lower end of the drill string 105 if not previously installed. The well logging tools 125 may be positioned by pumping the well logging tools 125 down the drill string 105 or otherwise moving the well logging tools 125 down the pipe 105 while the drill string 105 is within the well 110. The well logging tools 125 may then be coupled to an adapter sub 160 at the end of the drill string 105 and may be moved through, for example in the illustrated embodiment, a highly inclined portion 165 of the well 110 which would be inaccessible using armored electrical cable to move the well logging tools 125.

During well logging operations, the pump 130 may be operated to provide fluid flow to operate one or more turbines in the well logging tools 125 to provide power to operate certain devices in the well logging tools 125. However, when tripping in or out of the well 110, it may be unfeasible to provide fluid flow. As a result, power may be provided to the well logging tools 125 in other ways. For example, batteries may be used to provide power to the well logging tools 125. In one embodiment, the batteries may be rechargeable batteries and may be recharged by turbines during fluid flow. The batteries may be positioned within the housing of one or more of the well logging tools 125. Other manners of powering the well logging tools 125 may be used including, but not limited to, one-time power used batteries.

As the well logging tools 125 are moved along the well 110 by moving the drill string 105, signals may be detected by various devices, of which non-limiting examples may include a resistivity measurement device, a bulk density measurement device, a porosity measurement device, a formation capture cross-section measurement device 170, a gamma ray measurement device 175 and a formation fluid sampling tool 610, 710, 810 which may include a formation pressure measurement device 6a and/or 6b. The signals may be transmitted toward the surface of the earth along the drill string 105.

An apparatus and system for communicating from the drill string 105 to the surface computer 185 or other component configured to receive, analyze, and/or transmit data may include a second adapter sub 190 that may be coupled between an end of the drill string 105 and the top drive 155 that may be used to provide a communication channel with a receiving unit 195 for signals received from the well logging tools 125. The receiving unit 195 may be coupled to the surface computer 185 to provide a data path therebetween that may be a bidirectional data path.

Though not shown, the drill string 105 may alternatively be connected to a rotary table, via a Kelly, and may suspend from a traveling block or hook, and additionally a rotary swivel. The rotary swivel may be suspended from the drilling rig 101 through the hook, and the Kelly may be connected to the rotary swivel such that the Kelly may rotate with respect to the rotary swivel. The Kelly may be any mast that has a set of polygonal connections or splines on the outer surface type that mate to a Kelly bushing such that actuation of the rotary table may rotate the Kelly. A top drive may also be used.

An upper end of the drill string 105 may be connected to the Kelly, such as by threadingly reconnecting the drill string 105 to the Kelly, and the rotary table may rotate the Kelly, thereby rotating the drill string connected thereto.

Although not shown, the drill string 105 may include one or more stabilizing collars. A stabilizing collar may be disposed within or connected to the drill string 105, in which the stabilizing collar may be used to engage and apply a force against the wall of the well 110. This may enable the stabilizing collar to prevent the drill string 105 from deviating from the desired direction for the well 110. For example, during drilling, the drill string 105 may "wobble" within the well 110, thereby allowing the drill string 105 to deviate from the desired direction of the well 110. This wobble action may also be detrimental to the drill string 105, components disposed therein, and the drill bit 116 connected thereto. A stabilizing collar may be used to minimize, if not overcome altogether, the wobble action of the drill string 105, thereby possibly increasing the efficiency of the drilling performed at the well site and/or increasing the overall life of the components at the wellsite.

Figure 3:
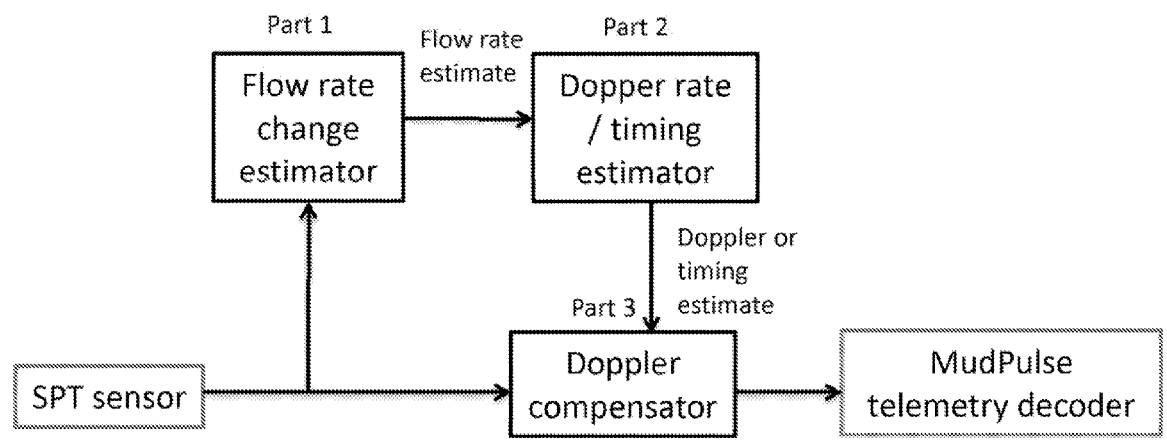
FIG. 3 is a flow chart or an aspect that detects and corrects for distortion in a fluid.

Referring to FIG. 3, a series of modules is represented to accomplish flow distortion related mud-pulse telemetry corrections. In the illustrated embodiment, three separate and distinct modules are presented. Each of the separate modules presented are a flow rate change estimator module 1, a rate/timing estimator module 2 and an effective speed of sound compensator or amplitude and velocity pressure propagation arrangement 3. Each of the separate modules will be discussed. Alternative methodologies for each of the modules are also discussed. For the flow rate change estimator module 1, a flow meter and a pressure transducer may be placed at the surface and their readings may be used. In one embodiment, a downlink manager may send this information to a processor to an algorithm combined with standpipe pressure. Utilizing mud properties, such as bulk modulus and circulating temperature, a phase change for the drilling fluid may be calculated.

In an alternative method for flow rate change estimator module 1, minor pressure variations may be measured\observed in the drilling fluid. The observed pressure variations may be recorded and the data may be used for analysis purposes. Through this testing and observation, phase change of the wave traveling within the drilling fluid may be observed and the changes tracked. In a non-limiting embodiment, measure while drilling receivers may be used to measure the pressure variations. If pressure variations occur over a predefined limit, a ratio of change of pressure to change in phase may be calculated.

In another embodiment for flow rate change estimator module 1, the flow rate change estimator may use a timing error detector to derive effective speed of sound change and/or the amplitude and velocity of pressure propagation. A turbo decoder may be used to determine if a bit confidence is below a threshold. The signal from the timing error detector can be used, for example, to track a timing change from which an amplitude and velocity and pressure propagation shift can be derived. As a non-limiting example, the telemetry signal may be used as a reference signal.

Referring to the rate/timing estimator module 2, the rate timing estimator may be accomplished by the following two non-limiting example embodiments. A first method, based on the flow rate change calculated in module 1, the change in phase may be used as a change in the time axis. In this embodiment, an increase in phase moves time forward and a decrease in phase moves time backward. Thus, a time delay or acceleration for each phase shift may be calculated to be applied to module three.

In another embodiment, a timing error detector may be used to do derive the amplitude and velocity of pressure propagation change for module 2. Alternatively for module 2, a turbo decoder may be used to determine that the bit confidence is below a threshold. The signal from the timing error detector can be used to track the timing change from which the estimate can be derived.

In relation to the compensator module 3, two alternative methodologies may be used. In the first methodology for module 3, the method for compensating a timing change may be, for example, using a skip/repeat samples periodically according to the amplitude and velocity of pressure propagation calculated in module 2. In a second methodology, polynomial interpolation is used, such as a time varying digital filter. In one non-limiting embodiment, a Farrow filter is used.

In either of the two methodologies for module 3, choice between either of the methods depends on the desired quality of the compensation. In one example recited below, there is dependence on the ratio between the sampling rate of a compensator and the bandwidth of the signal. This is captured on the X axis: samples/symbol. "Integral only" means that only integer indices, are used, wherein only skip\repeat samples are done periodically. Values between these two methods may be a simple linear interpolation.

In each of the modules discussed, the methodologies used in each of the modules is distinct allowing for modules to be used or not used at the discretion of an operator. Thus, in some non-limiting embodiments, only module 3 may be used, wherein other embodiments, modules 1, 2 and 3 are used.

Figures 2A, 2B:
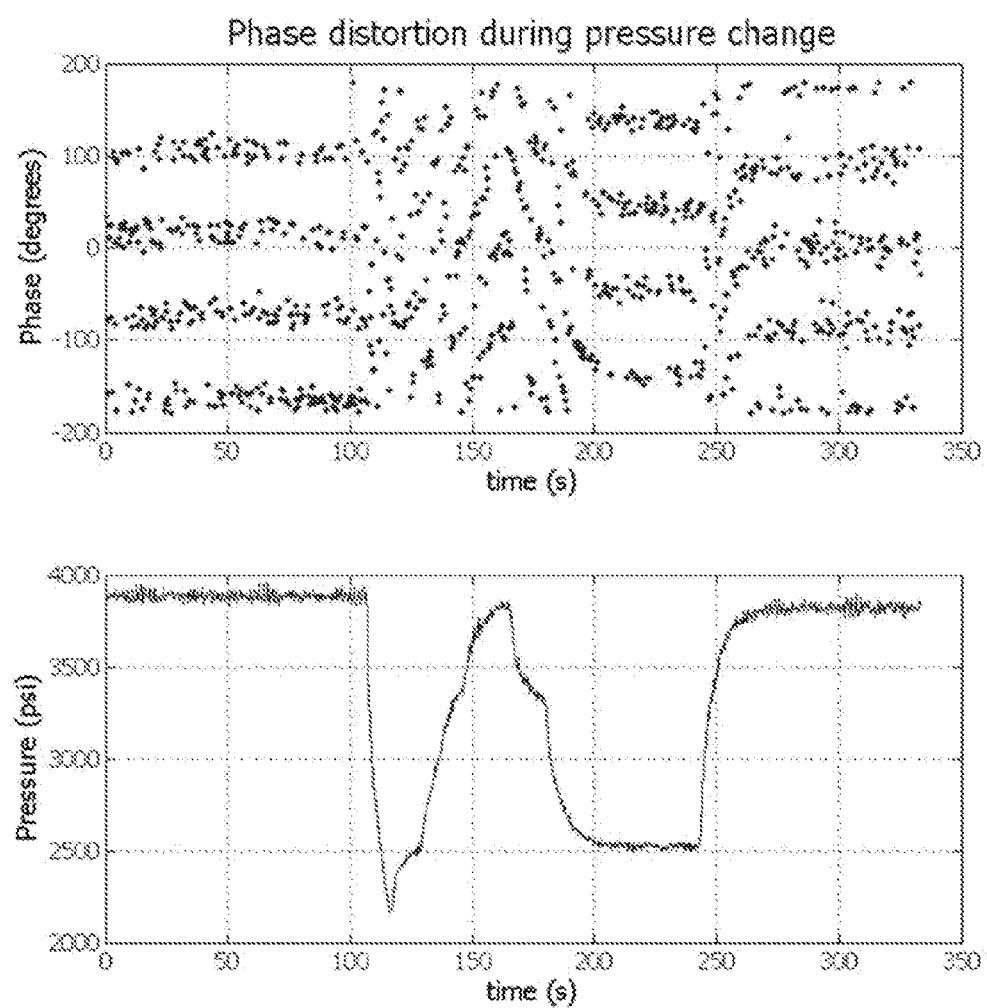
FIG. 2A is a graph of a phase of a fluid versus time for fluids used in mud-pulse telemetry.
FIG. 2B is a graph of a pressure versus time for fluids used in mud-pulse telemetry.

Referring to FIG. 2A, a graph of phase distortion during pressure change is illustrated. As presented, individual plots of data obtained from downhole information on a time axis is presented. A phase in degrees is presented as the Y axis. It can be seen that up to approximately time 100 seconds, a straight line value is represented. Additionally, for time values after 200 seconds, a more constant value is indicated. Between 100 seconds and 200 seconds, significant distortion is presented in the data presented in the graph.

Figure 4:
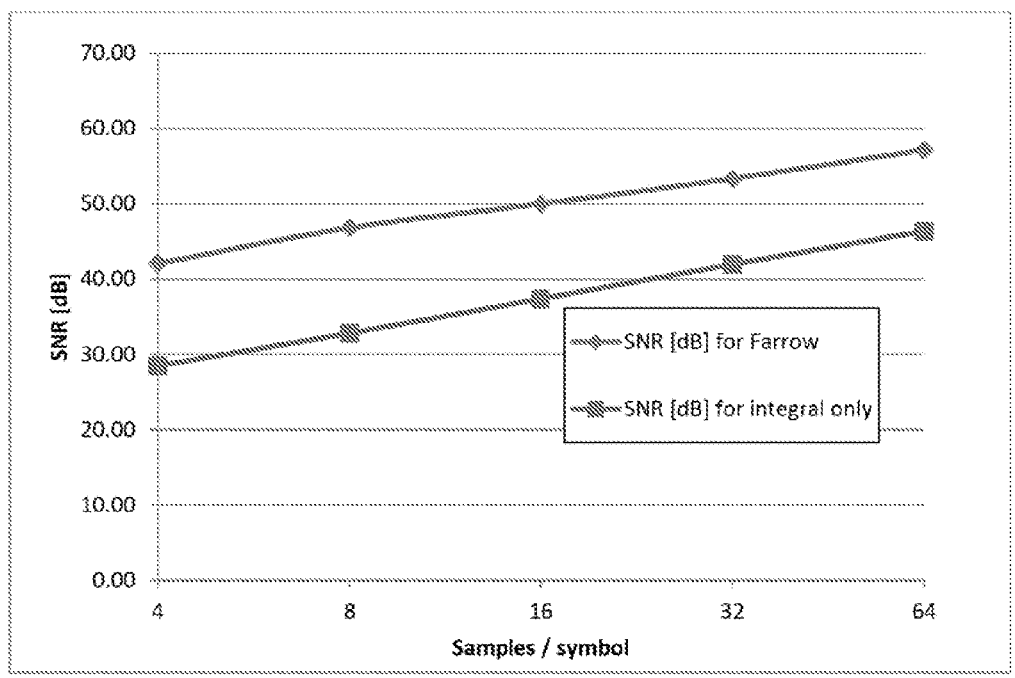
FIG. 4 is a graph of decibel strength vs. samples.

Referring to FIG. 2B, a line graph of phase distortion during pressure change is represented. Pressure measured in pounds per square inch is provided on the Y axis. In the X axis, time is represented. Similar to FIG. 2A Advantages are that RSS Rotary Steerable System are becoming commonly used in drilling. In order to maintain optimal tool settings, the directional driller must regularly adjust the RSS tool. The methodologies disclosed allow for more accurate and timely downlinking of data from the surface environment to the downhole environment. Referring to FIG. 4, a graph of decibels of signal strength vs. samples is provided. Two specific graphs of information are provided to an operator for review. Choice between the two graphs of data depends on the desired quality of the compensation. Values that fall between the two lines of data may be obtained from linear interpolation.

More accurate downlinking eliminates/limits operator error and increases overall speed and economy of drilled boreholes. The methodology, therefore, provides significant improvements over conventional downlinking technologies that merely send poor quality data between the transmitter and the receiver.

In one embodiment, a method for reconstituting a signal due to a flow distortion in a mud-pulse telemetry system is described comprising: obtaining at least one parameter to be transmitted by a transmitter to a receiver through the mud-pulse telemetry system, estimating a change in a flow rate in a borehole fluid along a trajectory of the mud-pulse telemetry system undergoing a fluid distortion, estimating a rate of the signal traveling through the borehole fluid along the trajectory of the mud-pulse telemetry system, calculating a compensation value for the signal sent along the trajectory in the borehole fluid; transmitting the signal of the at least one parameter through the mud-pulse telemetry system, receiving at least a portion of the signal of the at least one parameter and reconstituting at least a portion of the signal using the compensation value.

The method may also be accomplished wherein the obtaining the at least one parameter is through a sensor.

The method may also be accomplished wherein the estimating the change in the flow rate in the borehole fluid entails using a flow meter and a pressure transducer at a surface and a reading from the flow meter and the pressure transducer to estimate the change in the flow rate.

The method may also be accomplished wherein the estimating the change in the flow rate in the borehole fluid along the trajectory of the mud-pulse telemetry system undergoing the fluid distortion is through observing pressure variations and tracking phase changes resulting from the pressure variations, wherein a ratio of change in pressure of the fluid to change is phase of the fluid is obtained and the ratio is used to perform the estimating of the change in the flow rate.

The method may also be accomplished wherein the estimating the rate of the signal traveling through the borehole fluid along the trajectory of the mud-pulse telemetry system is through analysis of a time axis of the signal.

The method may also be accomplished wherein the estimating the rate of the signal traveling through the borehole fluid along the trajectory of the mud-pulse telemetry system is through using a timing error detector.

The method may also be accomplished wherein the estimating the rate of the signal traveling through the borehole fluid along the trajectory of the mud-pulse telemetry system is through using a turbo decoder to determine that a bit confidence is below a predetermined threshold.

The method may also be accomplished wherein the reconstituting the at least portion of the signal using the compensation value is through using a skipped periodical value according to a rate.

The method may also be accomplished wherein the reconstituting the at least portion of the signal using the compensation value is through using a repeated value according to a rate.

The method may also be accomplished wherein the reconstituting the at least portion of the signal using the compensation value is through using polynomial interpolation on the signal.

The method may also be accomplished wherein a Farrow filter is used for the polynomial interpolation of the signal.

In another embodiment, an article of manufacture on a computer readable medium is disclosed, the medium configured to execute instructions on a computer, the instructions executed comprising steps of obtaining at least one parameter to be transmitted by a transmitter to a receiver through the mud-pulse telemetry system, estimating a change in a flow rate in a borehole fluid along a trajectory of the mud-pulse telemetry system undergoing a fluid distortion, estimating a rate of the signal traveling through the borehole fluid along the trajectory of the mud-pulse telemetry system, calculating a compensation value for the signal sent along the trajectory in the borehole fluid, transmitting the signal of the at least one parameter through the mud-pulse telemetry system; receiving at least a portion of the signal of the at least one parameter and reconstituting at least a portion of the signal using the compensation value.

The article of manufacture may be accomplished wherein the obtaining the at least one parameter is through a sensor.

The article of manufacture may be accomplished wherein the estimating the change in the flow rate in the borehole fluid entails using a flow meter and a pressure transducer at a surface and a reading from the flow meter and the pressure transducer to estimate the change in the flow rate.

The article of manufacture may be accomplished wherein the estimating the change in the flow rate in the borehole fluid along the trajectory of the mud-pulse telemetry system undergoing the fluid distortion is through observing pressure variations and tracking phase changes resulting from the pressure variations, wherein a ratio of change in pressure of the fluid to change is phase of the fluid is obtained and the ratio is used to perform the estimating of the change in the flow rate.

What is claimed is:

1. A mud pulse telemetry method comprising:
   (a) transmitting a mud pulse telemetry signal from a downhole location to a surface location through a column of drilling fluid;
   (b) causing a transducer to measure a standpipe pressure at the surface location;
   (c) processing a change in the standpipe pressure measured in (b) in combination with at least one property of the drilling fluid to compute a phase change of the mud pulse telemetry signal caused by a change in a speed of sound in the drilling fluid,
       wherein the at least one property of the drilling fluid comprises bulk modulus;
   (d) processing the phase change computed in (c) to compute a time shift in the mud pulse telemetry signal,
       wherein the time shifts moves time forward when the phase change is an increase in phase and moves time backward when the phase change is a decrease in phase; and
   (e) applying the time shift to the mud pulse telemetry signal and decoding.

2. The method of claim 1, wherein:
   (b) further comprises measuring a flow rate of the drilling fluid; and
   (c) further comprises processing the standpipe pressure and the flow rate measured in (b) in combination with at least one property of the drilling fluid to compute the phase change.

3. The method of claim 1, wherein the phase change of the mud pulse telemetry signal is computed in (c) when the change in the standpipe pressure exceeds a predefined limit.

4. The method of claim 1, wherein (c) further comprises:
   (i) processing a plurality of minor changes in the standpipe pressure to compute a ratio of change of pressure to change in phase; and
   (ii) processing the ratio and the change in the standpipe pressure to compute the phase change when the change in the standpipe pressure exceeds a predefined limit.

5. The method of claim 1, wherein the change in the standpipe pressure is caused by downlinking data from the surface location to the downhole location through the column of drilling fluid.

6. A mud pulse telemetry method comprising:
   (a) transmitting a mud pulse telemetry signal from a downhole location to a surface location through a column of drilling fluid;
   (b) causing a transducer to measure a standpipe pressure at the surface location while transmitting in (a);
   (c) processing a plurality of minor changes in the standpipe pressure in combination with at least one property of the drilling fluid to compute a ratio of change of pressure to change in phase caused by a change in a speed of sound in the drilling fluid,
       wherein the at least one property of the drilling fluid comprises bulk modulus;

(d) processing the ratio and the change in the standpipe pressure to compute the phase change when the change in the standpipe pressure exceeds a predefined limit;

(e) processing the phase change computed in (d) to compute a time shift in the mud pulse telemetry signal, wherein the time shifts moves time forward when the phase change is an increase in phase and moves time backward when the phase change is a decrease in phase; and (f) applying the time shift to the mud pulse telemetry signal and decoding.

7. The method of claim 6, further comprising:

(g) downlinking data from the surface location to the downhole location through the column of drilling fluid, said downlinking causing the change in the standpipe pressure to exceed the predefined limit.

8. The method of claim 6, wherein the processing in (d) comprises dividing the change in standpipe pressure by the ratio.

\* \* \* \* \*